United States Patent
Lambert et al.

[19]

[11] Patent Number: 6,049,815
[45] Date of Patent: Apr. 11, 2000

[54] METHOD AND APPARATUS FOR FINITE FIELD MULTIPLICATION

[75] Inventors: Robert J. Lambert; Ashok Vadekar, both of Ontario, Canada

[73] Assignee: Certicom Corp., Ontario, Canada

[21] Appl. No.: 08/997,673

[22] Filed: Dec. 24, 1997

[30] Foreign Application Priority Data

Dec. 30, 1996 [GB] United Kingdom .................... 9627069

[51] Int. Cl.$^7$ ..................................................... G06F 7/00
[52] U.S. Cl. .......................................................... 708/492
[58] Field of Search ................................... 708/492, 491; 380/28

[56] References Cited

U.S. PATENT DOCUMENTS

| | | | |
|---|---|---|---|
| 4,162,480 | 7/1979 | Berlekamp | 708/492 |
| 4,165,444 | 8/1979 | Gordon | 380/44 |
| 4,797,921 | 1/1989 | Shiraishi | 380/28 |
| 5,313,530 | 5/1994 | Iwamura | 708/491 |
| 5,642,367 | 6/1997 | Kao | 714/784 |

FOREIGN PATENT DOCUMENTS 2176325   12/1986   United Kingdom .

*Primary Examiner*—Tan V. Mai
*Attorney, Agent, or Firm*—Finnegan, Henderson, Farabow, Garrett & Dunner, L.L.P.

[57] ABSTRACT

A method of computing the product D of two finite field elements B and C modulo an irreducible polynomial $f_1(x)$, wherein the finite field elements B and C are represented in terms of an optimal normal basis (ONB) of Type 1 over a field $F_{2^n}$ and the irreducible polynomial $f_1(x)$ being of degree n, which comprises the steps of representing the element B as a vector of binary digits $b_i$, where $b_i$ is a co-efficient of an $i^{th}$ basis element of the ONB representation of element B, in polynomial order, representing the element C as a vector of binary digits $c_i$, where $c_i$ is a co-efficient of an $i^{th}$ basis element of the ONB representation of element C, arranged in polynomial order, initializing a register A, selecting a digit $c_i$ of the vector C, computing a partial product vector A of the $i^{th}$ digit $c_i$ of the element C and the vector B, adding the partial product to the register A, shifting the register A, reducing the partial product A by a multiple $f_2(x)$ of the irreducible polynomial $f_1(x)$ if bits in a position above n are set, storing the reduced partial product in the register A, repeating for each successive bit of the vector C and upon completion the register A containing a final product vector; and reducing the final product vector A by the irreducible polynomial $f_1(x)$ if an $n^{th}$ bit of the register is set. The reduction step by the multiple of the irreducible polynomial simply involves a shift operation performed on the partial products.

18 Claims, 3 Drawing Sheets

METHOD AND APPARATUS FOR FINITE FIELD MULTIPLICATION

The present invention relates to a method and apparatus for multiplying elements of a finite field, and in particular for multiplying elements of a finite field in a processor having limited computation capability, such as a smartcard and wherein such computations are part of a cryptographic system.

BACKGROUND OF THE INVENTION

Arithmetic in finite fields is used extensively in applications such as coding-theory and cryptography. Cryptographic systems, in particular, make extensive use of modular arithmetic. Making calculations modulo n is like performing normal arithmetic in that it is commutative, associative and distributive. Modular arithmetic is also easier to work with since the ranges of intermediate values and results for addition, multiplication and subtraction are restricted. This is of particular importance when the computations implemented on a processor which has limited register length and speed.

In modular arithmetic, the set of integers modulo m is denoted $F_m = \{0,1,2,\ldots,m-1\}$. When m is a prime number p, then the set of integers modulo p, $F_p$, forms a finite field in which we can perform operations of addition, multiplication and subtraction. Furthermore, if $F_p = \{0,1,2,\ldots p-1\}$ and $C_i$ is an element of $F_p$, then the set of polynomials in x with coefficients from $F_p$ is $F_p[x] = \{ Cnx^n + \ldots + Co | Ci \in F_p, n \geq 0\}$.

As defined above, where the arithmetic is performed modulo a prime integer p, cryptographers may also use arithmetic modulo an irreducible polynomial f(x) of degree n whose coefficients are integers modulo q, where q is prime. These fields are designated symbolically by $F(q^n)$. Thus all arithmetic is done modulo some f(x) which is an irreducible polynomial of degree n and in which the coefficients of the polynomial are elements of a finite field. If q is equal to 2, then computation in $F(2^n)$ can be quickly implemented in hardware with linear feedback shift registers. For that reason, computation of a $F(2^n)$ is often quicker than computation over F(p).

The values of n which make a feasible cryptographic system tend to be relatively large. Finite fields used in cryptography are typically chosen from those with characteristic two, since these lend themselves to binary hardware and processors. A further specialization of the field of characteristic two are those having an optimal normal basis, either of type I or II. Bases of type I which are optimal normal bases have the characteristic that the coefficients of a polynomial expressed in terms of a polynomial basis are the permuted coefficients of the polynomial expressed in terms of a normal basis.

A finite field may be constructed from a generating element α and is composed of a vector space of the powers of α modulo the irreducible polynomial f(x) of degree n. For example $F2^3$ has the following elements: 0, 1, x, x+1, $x^2$, $x^2+1$, x, $x^2+x$, $x^2+x+1$. The component powers of α can then be reduced to degree less than n with the irreducible polynomial. These components are called the basis and for a field over the binary field of two elements, the coefficients of the basis are simply zeros and ones. If the resulting n-tuple of coefficients is ordered corresponding to the sequence $\alpha^0, \alpha^1, \ldots \alpha^{n-1}$, then the field has been represented in polynomial order. If instead the coefficients are ordered to correspond to the sequence $\alpha^{2^0}, \alpha^{2^1}, \ldots, \alpha^{2^{n-1}}$ (when these powers are of normal basis for the finite field) then the representation is in normal basis order. However when in polynomial order we will denote the basis elements in terms of a polynomial in x. This representation has several advantages for hardware implementation and is more fully described in UK patent application GB2,176,325.

For implementation on a binary processor, the components are typically distributed across several processor words (which can be considered as a multi-word register), since a single processor word is not sufficient to hold all components if the length of the finite field is even moderately large. The length of these registers will exceed one hundred bits even for efficient elliptic curve crypto-systems. Smartcard systems are typically very memory poor (at least for RAM memory) and this invention stems from (but is not limited to) the work of the inventors to implement public key systems in such environments. The processors available in such systems are typically also not highly powered, so it is also of importance to develop efficient methods that can be useful in that environment.

SUMMARY OF THE INVENTION

This invention seeks to provide a method of multiplying finite field elements on a processor with limited processing capability, such as a smartcard or the like.

In accordance with this invention there is provided a method of determining the product of two finite field elements B and C modulo an irreducible polynomial $f_1(x)$ wherein the finite field elements B and C are represented in terms of an optimal normal basis of type I for a field size n over the binary field and having an irreducible polynomial $f_1(x)$ of degree n, the method comprising the steps of:

a) representing the element B as a vector of binary digits $b_i$, where $b_i$ is the coefficient of $\alpha^{2^i}$ in an optimal normal basis of type I representation of B and where the $b_i$'s are in polynomial order;

b) representing the element C as a vector of binary digits $c_i$, where $c_i$ is the coefficient of $\alpha^{2^i}$ in an optimal normal basis of type I representation of C and where the $c_i$'s are in polynomial order;

c) representing the partial product A of an ith component $b_i$ of the element B and the element C as a vector of binary digits $d_i$;

d) reducing the partial product A by a multiple $f_2(x)$ of the irreducible polynomial $f_1(x)$;

e) adding to the reduced partial product of step d) the partial product of a successive component $b_{i-1}$ of B and the element C;

f) repeating steps d) and e) for successive ones of the binary digits of B;

g) testing the topmost bit of the partial product A;

h) reducing the element A by the irreducible polynomial $f_1(x)$ if the topmost bit is set whereby A represents the product of the two finite field elements B and C modulo $f_1(x)$.

BRIEF DESCRIPTION OF THE DRAWINGS

Embodiments of the invention will now be described by way of example only with reference to the accompanying drawings in which.

DETAILED DESCRIPTION OF A PREFERRED EMBODIMENT

Figure 1:
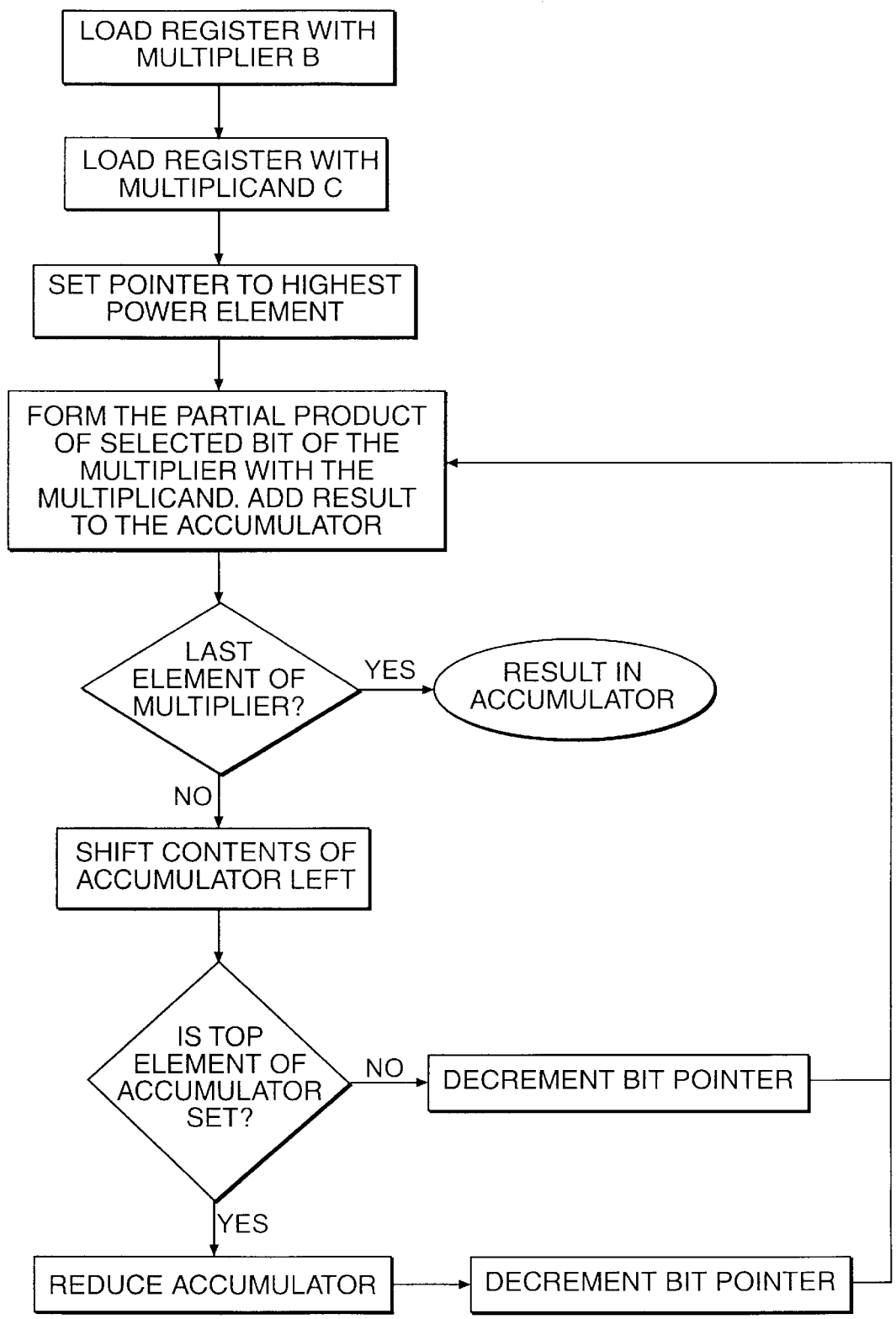
FIG. 1 is a flowchart showing the multiplication of two finite field elements.

The following discussion provides an outline of polynomial multiplication modulo an irreducible polynomial $f_1(x)$. Multiplication of two finite fields is commonly made by choosing one of the two elements to be the multiplier, and the other element to be the multiplicand. The components of the multiplier (in analogy to the digits of a multiplication of numbers using longhand) are used to scale the multiplicand, which is shifted by the position of the multiplier component concerned, and the results added together in partial products. The multiplication of binary polynomials in entirely analogous, except that carries between positions are not involved, and where component wise additions consist of simple exclusive OR's. Components of the multiplier may be used in any order to compose partial products; typically they are used in ascending (or sometimes descending) order as illustrated in the following example where polynomials B and C to be multiplied may be represented as follows:

$$B = x^4 + x^3 + x^1 + x^0 \quad (1)$$

$$C = x^3 + x^2 + x^0 \quad (2)$$

Simply taking the coefficients of the polynomials and performing a multiplication thereon

```
      1 1 0 1 1
        1 1 0 1
      ─────────
      1 1 0 1 1
    1 1 0 1 1
  1 1 0 1 1
  ───────────────
  1 0 1 0 1 1 1 1
``` to produce the result $$A = x^7 + x^5 + x^3 + x^2 + x^1 + x^0 \quad (3)$$

When two polynomials are to be multiplied modulo another polynomial (the irreducible polynomial in the case of finite fields) then a reduction with that polynomial is performed to achieve the final result. This reduction may be made to the final result, or to components of the partial products. If the irreducible polynomial is $$f_1(x) = x^4 + x^3 + x^2 + x^1 + x^0 \quad (4)$$

then the binary representation of its coefficients is 11111. To reduce the results (or intermediates), multiples of the irreducible are subtracted from the result (or intermediates) until the degree is reduced below n, the degree of the irreducible. In the case of characteristic two this operation is identical to addition. The result A of equation (3) may be reduced using the polynomial (4), producing the result

```
  1 0 1 0 1 1 1 1                (5)
  1 1 1 1 1
  ───────────────
    1 0 1 0 1 1 1
    1 1 1 1 1
    ─────────────
      1 0 1 0 1 1
      1 1 1 1 1
      ───────────
        1 0 1 0 1
        1 1 1 1 1
        ─────────
          1 0 1 0
```

$$A = x^3 + x^1$$

When performing reductions at each stage of building the partial products, it is efficient to compose the partial products using the components of the multiplier in descending order.

Referring to the flowchart of FIG. 1, it may be seen that with this configuration, the number of reductions required is reduced, since any additional components resulting from reducing the topmost components can be added together and reduced as the lower components of the product are reduced. In addition, it is not necessary to shift the multiplicand as the partial products are composed in this configuration, or for the register containing the partial product to be twice the length of the multiplier and multiplicand registers. Instead the register accumulating the partial products can be shifted to prepare it to accept the addition of the next partial product as the components of the multiplier are utilized.

To reduce the computation steps required in reducing the partial products (or at any other stage), the use of irreducible polynomials with minimal non-zero coefficients are often employed. The minimal weight irreducible polynomials are those with three non-zero terms, the so-called trinomials. For a Galois field $F(2^n)$, cryptographers like to use the trinomial $X^n + x^k + 1$. These polynomials have been proposed for cryptography owing to their minimum feedback into the lower order terms of the polynomial as reduction progresses.

Figure 2:
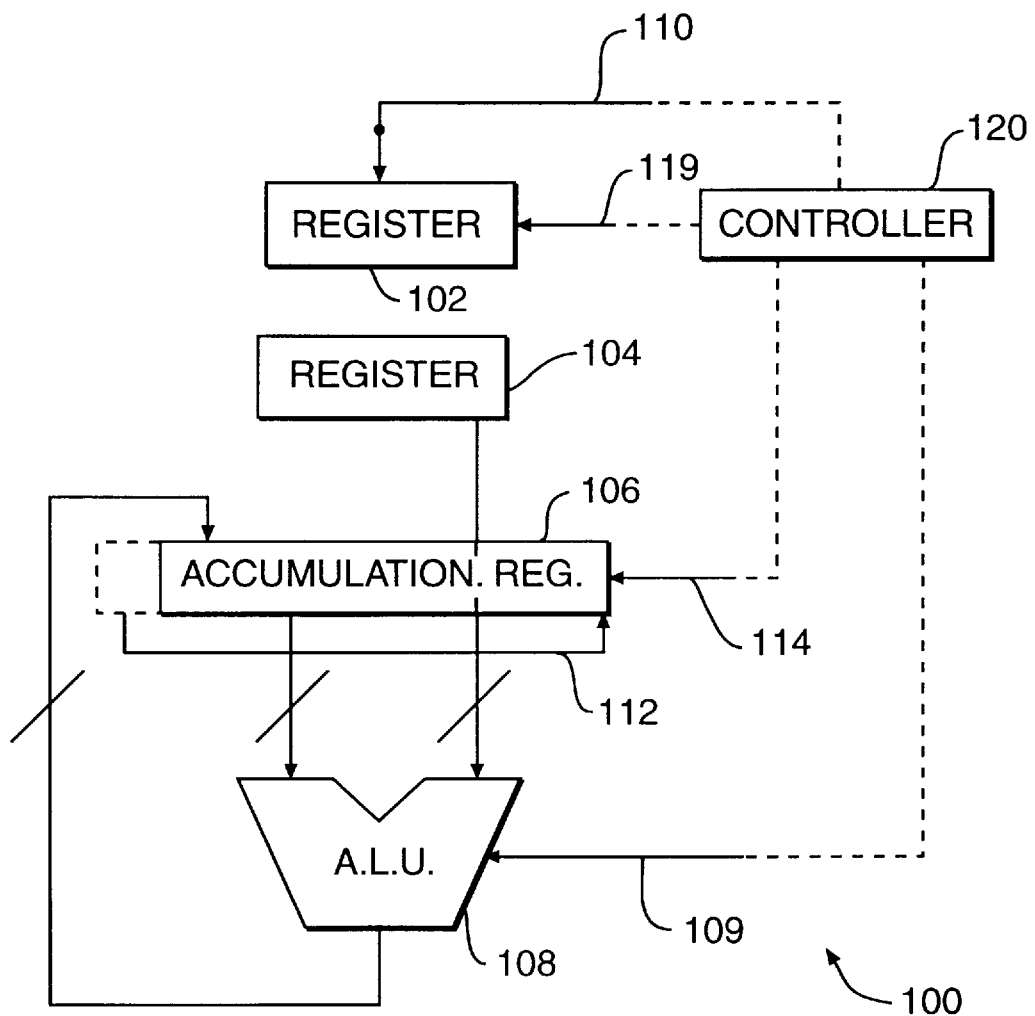
FIG. 2 is a block diagram of a multiplier to implement multiplication of two elements in the field $F(2^n)$.

Referring now to FIG. 2, and the discussion following, an embodiment according to the present invention is described. Table 1 shows a list of values of $n \leq 2000$ for which the field $F(2^n)$ has an optimal normal basis (ONB) and in particular the list of values flagged with '*' or '+' symbols have an ONB of type I. Generally if $$f_1(x) = x^n + x^{n-1} + \ldots x^2 + x + 1 \quad (6)$$

is irreducible over $F(2)$, then $F(2^n)$ has a type I normal basis elements $1, x, x^2, \ldots, x^{n-1}$. Utilizing a type I ONB in polynomial order, the number of feedback terms is actually maximum, since every coefficient of the irreducible polynomial $f_1(x)$ is one up to the required degree. Instead of using this irreducible polynomial, we use instead, in one embodiment, first a multiple of the irreducible polynomial $$f_2(x) = (x+1)f_1(x) = x^{n+1} + 1 \quad (7)$$

for the purposes of reduction. The actual irreducible $f_1(x)$, is employed only once as a final step to complete the reduction.

Since the polynomial $f_2(x)$, is a multiple of the irreducible polynomial $f_1(x)$, it may be used as an intermediate reduction polynomial. The appealing feature of this intermediate reduction is the extreme simplicity of the reduction step, which consists of the taking those components or terms of degree larger than n, and shifting them down to the bottom of the representation, adding them in with the field addition (EXOR'ing). This has the additional advantage that it may be done on a word basis, where the mechanism on which the field multiplication is to be performed operates upon words of some bit-length. For example for n=10, the irreducible polynomial is $f_1(x)=x^{10}+\ldots+x^2+x+1$ and the multiple of the irreducible is $f_2(x)=x^{11}+1$. Thus if the processor implementing the operation has a word length of four bits, successive partial products may be accumulated until the number of components exceeds n (ten in this case) and when these components fill a word length, they may simply be removed and EXOR'ed with the low word of the accumulated partial product. This has the effect of reducing with the $f_2(x)$ polynomial.

When appropriate for the following computation, the reduction may be completed employing the irreducible polynomial itself, that is, using $f_1(x)$ not $f_2(x)$. This operation is simple and efficient as well, and is implemented by testing the top component (bit) of the partially reduced (that is with the $f_2(x)$) element, and complementing every component (bit) of the result if this top-component bit is non-zero. The degree of the result is reduced to n−1 thereby.

In a further embodiment of the invention the multiplier may be pre-processed before the process of multiplication is initiated. Since the polynomial $f_1(x)$ is equivalent to zero in the finite field, it may be added to the multiplier without affecting the result of the computation. It is advantageous as regarding computational effort if the number of non-zero components (bits) of the multiplier are reduced. Therefore, if the number of ones in the multiplier register is greater than the quantity n/2, then by adding the polynomial $f_1(x)$ to the representation, the number of non-zero elements will be reduced to less than or equal to this same quantity, since this operation of addition will have the effect of complementing the components of the representation, up to the component of degree n. This complementation is also efficiently computable on a machine that is capable of binary operations upon the words of the representation. As may be seen as follows:

for example if n=10
and $$f_1(x)=x^{10}+x^9+\ldots+x^2+x+1$$

and if the multiplier $$b=x^9+x^8+x^6+x^4+x^3+x^2+x^1+1$$

then, modulo $f_1$, an equivalent but more efficient multiplier is $$b'=b+f_1=x^{10}+x^7+x^5$$

As shown in FIG. 2, a schematic of a processor is indicated generally by reference numeral 100, for determining the product of two finite field elements B and C modulo an irreducible polynomial $f_1(x)$ wherein the finite field elements B and C may be represented in terms of an optimal normal basis of type I for a field size n over the binary field and having an irreducible polynomial $f_1(x)$ of degree n.

The processor 100 includes a first and second general purpose register 102 and 104 respectively. An accumulator register 106 is provided and is coupled to an ALU 108 via a data path 120 and 122 respectively. An output data path 124 is provided from the output of the ALU to the registers and the accumulator 106. Each of the registers is capable of bit shift operation.

The element B denoted the multiplier and which as a vector of binary digits $b_i$, where $b_i$ is the coefficient of $\alpha^{2^i}$ in an optimal normal basis of type I representation of B and where the $b_i$'s are in polynomial order are stored in a register 102 of length at least n+1-bits. The element C denoted the multiplicand and which is a vector of binary digits $c_i$, where $c_i$ is the coefficient of $\alpha^{2^i}$ in an optimal normal basis of type I representation of C and where the $c_i$'s are in polynomial order are stored in a register 104 of length at least n+1-bits. An accumulator A is also provided for storing the partial product A of an ith component $b_i$ of the element B and the element C as a vector of binary digits $d_i$. The accumulator A 106 has a length of at least n+1-bits, but may in certain instances be longer, should the processor be capable of word length operations. Inputs to the arithmetic logic unit (ALU) 108 are provided from the multiplicand register 104 and the accumulator register 106. The ALU 108 adds (EXOR) its inputs to provide a result which is stored back in accumulator 106.

In operation, the elements B and C are stored in their respective registers. A bit selector signal 110 to the multiplier register 102 is set so that the left-most bit of the multiplier is selected. Here bit significant increases from right to left. The bit $b_m$ is selected and multiplied with the entire contents of the multiplicand C. This result is then added(EXOR'ed) to the contents of the accumulator A. In effect if $b_i$ is 1 then B is added to the accumulator or else if $b_i$ is 0 then 0 may be added to the accumulator or this operation skipped. The add operation is controlled by an add control signal 109 to the accumulator. The process of multiplying and adding to the accumulator forms the partial products of each intermediate multiplication step. Next the contents of the accumulator is shifted left by applying a shift left signal 114 to the accumulator, which is the equivalent of multiplying by a factor x. The top-most bit is carried into the bottom position of the accumulator 106, as shown by numeral 112 in FIG. 2. The movement of the upper bit to the bottom bit position is equivalent to an intermediate reduction of the result by $f_2(x)$ as outlined earlier. This process is repeated for successive bits of the multiplier. The carry of the topmost bit into the bottom position of the accumulator may be delayed until a full word of component bits over n bits is accumulated, this overflow word may then be removed and EXORed into the bottom of register A. The control signals such as the add control 109, the bit selector signal 110, the shift left signal 114 and the carries may be provided by a controller or sequencer 120.

The bit selector on the multiplier is shifter right (less significant) one bit and the process repeated in the same way and for each less significant bit of b until the bits of b are exhausted. After this is complete the top-most bit of the accumulator is tested and if set then the contents of the accumulator is inverted, which is the equivalent of reducing the final product by $f_1(x)$. If the top-most bit is not set then the result in the accumulator is the final product modulo the irreducible.

As mentioned earlier in a further embodiment a complement signal 119 may be provided to the multiplier if the number of 1's in the multiplier is greater than n/2. More generally however, if either input to the multiplier has more than n/2 non-zero (ones) components, then that input can be complemented. Thus the element with the least number of ones may be selected as the multiplier, and this selection can also include the complements.

The square of an element may be calculated in exactly the same manner as the multiplication described above. When multiplying an element of a finite field with itself, simplifications occur which make the calculation computationally much more efficient that the non-squaring multiplication described above. The normal basis representation of an element has the advantage that squaring can be computed merely by a cyclic shift of the representation, which is maintained in normal basis order. When memory is at a premium, this not only has the advantage of extreme simplicity, and speed, but also allows elements to be squared (and by inverting the process, square-rooted) in place (that is, an additional register used to contain the result is not required). If an element B to be squared is represented as, that is in polynomial basis, then $$B = \sum_{i=0}^{n} b_i X^i \qquad (8)$$

The square of the element is $$B^2 = \sum_{i=0}^{n/2} b_i X^{2i} + \sum_{i=n/2+1}^{n} b_i X^{2(i-n/2)-1} \qquad (9)$$

The following describes an embodiment of the invention for squaring (and also square root extraction, by inverting the process) of a type I ONB finite field element, represented in polynomial order, in place.

When squaring an element in a field of characteristic two, the cross-product terms all become zero since they occur twice, using the fact that 2 becomes 0 in a field of characteristic two. This has the effect that the first stage of squaring can be computed by interleaving zeros and reducing. As in the multiplication case with non-identical elements we will reduce first with the polynomial $f_2(x)$. Thus continuing the example for n=10 if the coefficients of an element B can be represented in descending order as 01011010110, then squaring involves interleaving zeros to the left of each element as follows 0001000101000100010100. This result may then be reduced with the polynomial $f_2(x)$, being the coefficients which are 0010001010, the n components above the n+1 components of the interleaved component.

This unfortunately requires a double length register, or a source and destination register, to perform the operation. If such a double length register is available, then the partial reduction with $f_2(x)$ is made very efficient by reducing word by word, in decreasing order, as was done in the multiplication above.

The partial reduction with $f_2(x)$ has the advantage that, proceeding from the lowest (or zero degree) component, that the components of degree $[0, 1, \ldots, n/2]$ are relocated to the even components $[0, 2, 4, \ldots, n]$ in order (n is even for a type I ONB), and the remaining components $[n/2+1, n/2+2, \ldots, n]$ are relocated to the odd components $[1, 3, 5, \ldots, n-1]$ in order, by the process of the squaring operation. This may also be seen from equation (9). We use this fact to provide a second squaring operation that has the advantage that the computation can be made in place.

For squaring in place first align the second half of the representation to word boundaries so that the upper portion, that is the $[0,1, \ldots, n/2]$ portion contributing to the odd locations, begins on a word boundary. To this effect, any unused portion of the topmost word, and perhaps one additional word may be required as the top half of the components are shifted up to a word boundary. If for example a word is a byte long then a component B=01011010110 may be stored as 0000101100010110. This representation may be broken up into words represented as follows:

$$O_1=0000,\ O_0=1011,\ e_1=0001,\ e_0=0110$$

These components interleaved with zeroes may be represented as follows:

$$\hat{O}_1=00000000,\ \hat{O}_0=10001010,\ \hat{e}_1=00000001,\ \hat{e}_0=00010100$$

At this point, the components that will be positioned into the even locations are all in order in the bottom half of the register (and by default, word aligned), whereas the components contributing to the odd locations are all in order in the top half of the register (also word aligned preferably). The components are now interleaved in place. Consider the words of the register to be paired together, the bottom word of the bottom half paired with the bottom word of the top half, with this pairing progressing upwards through the pairs.

Considering the first pair, the word in the bottom register will contribute components to the even locations of the zeroth word of the result, as well as the even locations of the next word of the result (numbering here starts from zero). The word in the top of the register will similarly contribute components to the odd locations of the zeroth word of the result and the odd components of the next word of the result. In other words, the bottom word of the pair consists of the concatenation $e_1\ e_0$ and the top word of the pair of $o_1 o_0$ where $e_0$ is the bottom half of the word (assuming the word-size is even) that will contribute only to the even locations of the zeroth word, and $e_1$ will contribute only to the even locations of the next word. The word halves $o_1\ o_0$ similarly contribute to the odd locations of word zero and one respectively.

Let new $\hat{e}_0$ be the components of $e_0$ interleaved with zeros so that the components of $e_0$ are in the even locations of the word, let $\hat{e}_1$ be the exact same word except using the components of $e_1$. Similarly let $\hat{o}_0$ have the components of $o_0$ positioned in the odd locations, and also $\hat{o}_1$.

In a further embodiment pairs of $(o_1 o_0,\ e_1\ e_0)$ my be operated upon to produce the pair of words $(\hat{o}_1 \oplus \hat{e}_1, \hat{o}_0 \oplus \hat{e}_0)$. In a preferred embodiment a lookup table with half the word size may be used to produce components interleaved with zero. Alternately, hardware may be introduced to perform the interleaving.

Positioning to odd locations is made thereafter with a shift of the word (or even locations can be produced with a shift if the table is setup to produce odd interleaved locations).

At this point the components of words are in the correct location to produce the square, but the words themselves are not in the correct order.

Figure 3:
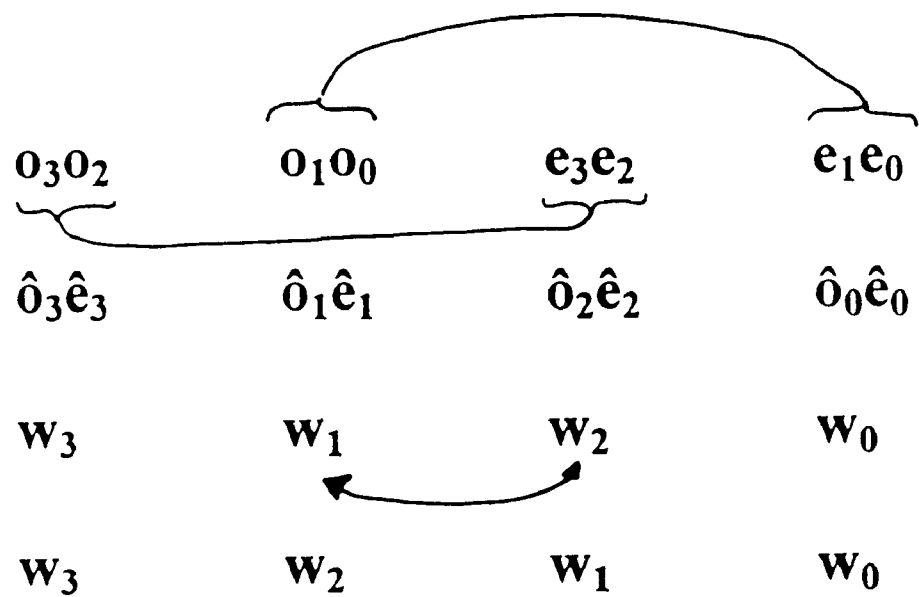
FIG. 3 is an example illustrating a squaring operation.

Referring to FIG. 3, where $w_0$ denotes the assembled value $\hat{o}_0 \oplus \hat{e}_0$. $w_1$ denotes $\hat{o}_1 \oplus \hat{e}_1$ and similarly for $w_2$ and $w_3$. To complete the squaring operation, permute the words of the register, which may involve word read and write operations on the processor.

While the invention has been described in connection with the specific embodiment thereof, and in a specific use, various modifications thereof will occur to those skilled in the art without departing from the spirit of the invention as set forth in the appended claims.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

a computer system having a computer program with functions for invocation and a control program for invoking said functions, said finite field elements B and C being repre-

TABLE

| 2+   | 113  | 293  | 473  | 676* | 873   | 1110  | 1310  | 1533  | 1790  |
|------|------|------|------|------|-------|-------|-------|-------|-------|
| 3    | 119  | 299  | 483  | 683  | 876*  | 1116* | 1323  | 1539  | 1791  |
| 4*   | 130* | 303  | 490+ | 686  | 879   | 1118  | 1329  | 1541  | 1806  |
| 5    | 131  | 306  | 491  | 690  | 882*  | 1119  | 1331  | 1548* | 1811  |
| 6    | 134  | 30   | 495  | 700* | 891   | 1121  | 1338  | 1559  | 1818  |
| 9    | 135  | 316* | 508* | 708* | 893   | 1122* | 1341  | 1570* | 1821  |
| 10*  | 138* | 323  | 509  | 713  | 906*  | 1133  | 1346  | 1583  | 1829  |
| 11   | 146  | 326  | 515  | 719  | 911   | 1134  | 1349  | 1593  | 1835  |
| 12*  | 148* | 329  | 519  | 723  | 923   | 1146  | 1353  | 1601  | 1838  |
| 14   | 155  | 330  | 522* | 725  | 930   | 1154  | 1355  | 1618* | 1845  |
| 18+  | 158  | 338  | 530  | 726  | 933   | 1155  | 1359  | 1620* | 1850  |
| 23   | 162* | 346* | 531  | 741  | 935   | 1166  | 1370  | 1626  | 1854  |
| 26   | 172* | 348* | 540* | 743  | 938   | 1169  | 1372* | 1636* | 1859  |
| 28*  | 173  | 350  | 543  | 746  | 939   | 1170* | 1380* | 1649  | 1860* |
| 29   | 174  | 354  | 545  | 749  | 940*  | 1178  | 1394  | 1653  | 1863  |
| 30   | 178* | 359  | 546* | 755  | 946*  | 1185  | 1398  | 1659  | 1866+ |
| 33   | 179  | 371  | 554  | 756* | 950   | 1186* | 1401  | 1661  | 1876* |
| 35   | 180* | 372* | 556* | 761  | 953   | 1194  | 1409  | 1666* | 1883  |
| 36*  | 183  | 375  | 558  | 765  | 965   | 1199  | 1418  | 1668* | 1889  |
| 39   | 186  | 378+ | 561  | 771  | 974   | 1211  | 1421  | 1673  | 1898  |
| 41   | 189  | 378* | 562* | 772* | 975   | 1212* | 1425  | 1679  | 1900* |
| 50   | 191  | 386  | 575  | 774  | 986   | 1218  | 1426* | 1685  | 1901  |
| 51   | 194  | 388* | 585  | 779  | 989   | 1223  | 1430  | 1692* | 1906* |
| 52*  | 196* | 393  | 586* | 733  | 993   | 1228* | 1439  | 1703  | 1923  |
| 53   | 209  | 398  | 593  | 785  | 998   | 1229  | 1443  | 1706  | 1925  |
| 58*  | 210+ | 410  | 606  | 736* | 1013  | 1233  | 1450* | 1730  | 1926  |
| 60*  | 221  | 411  | 611  | 791  | 1014  | 1236* | 1451  | 1732* | 1930* |
| 65   | 226* | 413  | 612* | 796* | 1018* | 1238  | 1452* | 1733  | 1931  |
| 66*  | 230  | 414  | 614  | 803  | 1019  | 1251  | 1454  | 1734  | 1938  |
| 69   | 231  | 418* | 615  | 809  | 1026  | 1258* | 1463  | 1740* | 1948* |
| 74   | 233  | 419  | 618+ | 810  | 1031  | 1265  | 1469  | 1745  | 1953  |
| 81   | 239  | 420* | 629  | 818  | 1034  | 1269  | 1478  | 1746* | 1955  |
| 82*  | 243  | 426  | 638  | 820* | 1041  | 1271  | 1481  | 1749  | 1958  |
| 83   | 245  | 429  | 639  | 826* | 1043  | 1274  | 1482* | 1755  | 1959  |
| 86   | 251  | 431  | 641  | 828* | 1049  | 1275  | 1492* | 1758  | 1961  |
| 89   | 254  | 438  | 645  | 831  | 1055  | 1276* | 1498* | 1763  | 1965  |
| 90   | 261  | 441  | 650  | 833  | 1060* | 1278  | 1499  | 1766  | 1972* |
| 95   | 268* | 442* | 651  | 834  | 1065  | 1282* | 1505  | 1769  | 1973  |
| 98   | 270  | 443  | 652* | 846  | 1070  | 1289  | 1509  | 1773  | 1978* |
| 99   | 273  | 453  | 653  | 852* | 1090* | 1290* | 1511  | 1778  | 1983  |
| 100* | 278  | 460* | 658* | 858* | 1103  | 1295  | 1518  | 1779  | 1986* |
| 105  | 281  | 466* | 659  | 866  | 1106  | 1300* | 1522* | 1785  | 1994  |
| 106* | 292* | 470  | 660* | 870  | 1108* | 1306* | 1530* | 1786* | 1996* |

≅2000 for which the field $F_{2^n}$ has an ONB.

The embodiments of the invention in which an exclusive property or privilege is claimed are defined as follows:

1. A computer system for determining the product of two finite field elements B and C modulo an irreducible polynomial $f_1(x)$, wherein the finite field elements B and C are represented in terms of an optimal normal basis (ONB) of Type 1 over a field $F_{2^n}$ and said irreducible polynomial $f_1(x)$ being of degree n, comprising:

(a) a memory containing a first vector of binary digits $b_i$, where $b_i$ is a co-efficient of the $i^{th}$ basis element of said ONB representation of element B, arranged in polynomial order;

a second vector of binary digits $c_i$, where $c_i$ is a co-efficient the $i^{th}$ basis element of said ONB representation of element C, arranged in polynomial order;

a computer program having functions for invocation, said functions for computing a partial product of a multiplier with a multiplicand and for reducing said partial product by a multiple of said irreducible polynomials $f_1(x)$;

(b) a control program for invoking said functions; and (c) a processor for running said computer program.

2. A method of determining the product of two finite field elements B and C modulo an irreducible polynomial $f_1(x)$ in sented in terms of an optimal normal basis of Type 1 over a field of $F_{2^n}$ and said irreducible polynomial $f_1(x)$ being of degree n, and said field elements B and C being represented as a vector of binary digits, each digit being the co-efficient of the elements arranged in polynomial order, said method comprising:

(a) invoking a function to compute the partial product of said element B with a selected digit of said element C;

(b) monitoring an overflow bit of said partial products;

(c) invoking a function for reducing said partial products by a multiple $f_2(x)$ of the irreducible $f_1(x)$ when said overflow occurs and deriving a reduced partial product therefrom;

(d) adding said reduced partial product to said successive partial product;

(e) continuing said steps (c) and (d) for successive digits of said element C to derive a final product;

(f) reducing said final product by said irreducible $f_1(x)$ if said $n^{th}$ bit is set.

3. A method of computing the product D of two finite field elements B and C modulo an irreducible polynomial $f_1(x)$, wherein the finite field elements B and C are represented in terms of an optimal normal basis (ONB) of Type 1 over a field $F_{2^n}$ and said irreducible polynomial $f_1(x)$ being of degree n, said method comprising the steps of:
(a) representing the element B as a vector of binary digits $b_i$, where $b_i$ is a co-efficient of an $i^{th}$ basis element of said ONB representation of element B, in polynomial order;
(b) representing said element C as a vector of binary digits $c_i$, where $c_i$ is a co-efficient of an $i^{th}$ basis element of said ONB representation of element C, arranged in polynomial order;
(c) initializing a register A;
(d) selecting a digit $c_i$ of said vector C;
(e) computing a partial product vector A of said $i^{th}$ digit $c_i$ of said element C and the vector B;
(f) adding said partial product to said register A;
(g) shifting said register A
(h) reducing said partial product A by a multiple $f_2(x)$ of the irreducible polynomial $f_1(x)$ if bits in a position above n are set;
(i) storing said reduced partial product in said register A;
(j) repeating said steps (e) to (h) for each of said successive bit of said vector C and upon completion said register A containing a final product vector; and
(k) reducing said final product vector A by said irreducible polynomial $f_1(x)$ if an $n^{th}$ bit of said register is set.

4. A method as defined in claim 3, said reducing said partial product A includes shifting said bits greater than n to said lower most bit positions and adding said bits thereto.

5. A method as defined in claim 4, said shifting being performed on a word length of bits.

6. A method as defined in claim 5, said adding being an XORing.

7. A method as defined in claim 3, said reducing said partial product A includes testing said (n+1)th bit and shifting said bit said lower most bit positions and adding said bit thereto.

8. A method as defined in claim 3, including storing said vector B in a register.

9. A method as defined in claim 3, said multiple $f_2(x)$ being represented by $f_2(x)=(x+1)f_1(x)$.

10. A method as defined in claim 3, said reducing said final partial product A comprises complementing said component bits to thereby reduce said result to degree (n−1).

11. A method as defined in claim 3, including the step of adding said irreducible $f_1(x)$ to said vector B if the number of ones(1) bits of said vector is greater than n/2.

12. A method as defined in claim 11, said step comprising complementing said bits up to said component of degree n.

13. A method as defined in claim 3, said bits $c_i$ being selected in decreasing significance.

14. A method as defined in claim 3, said $I^{th}$ basis element having a form $\alpha^{2^i}$.

15. A finite field multiplier for computing the product D of two finite field elements B and C modulo an irreducible polynomial $f_1(x)$, wherein the finite field elements B and C are represented in terms of an optimal normal basis (ONB) of Type 1 over a field $F_{2^n}$ and said irreducible polynomial $f_1(x)$ being of degree n, comprising:
a) a register B for holding the digits $b_i$ of a vector of binary digits $b_i$, where $b_i$ is a co-efficient of an $i^{th}$ basis element of said ONB representation of said element B, arranged in polynomial order;
b) an shift register A for holding a result of said computation and of size at least greater than the degree n of the finite field and for shifting its contents in response to a shift control signal;
c) means for sequentially selecting digits $c_i$ of a vector of binary digits $c_i$, where $c_i$ is a co-efficient of an $i^{th}$ basis element of said ONB representation of said element C, arranged in polynomial order, and for generating an add control signal in response to said digit $c_i$ being set; and
d) an arithmetic logic unit(ALU) having a finite field adder circuit responsive to said add control signal, for adding said register B and said register A received as vectors of binary digit inputs and outputting a result of said addition to said shift register A thereby computing a partial product vector A of said $i^{th}$ digit $c_i$ of said element C and the vector B while adding said result to a previous partial product in said register A and whereby said successive partial products may be reduced by a multiple $f_2(x)$ of the irreducible polynomial $f_1(x)$ if bits (n+1) or greater are set by shifting said upper (n+1) bits to a lowermost (n+1) bits of said register A; said reduced partial products being computed for successive components of said vector C and upon completion said register A containing a final product vector and said final product vector A being reduced by said irreducible polynomial $f_1(x)$ if an $n^{th}$ bit of said register is set by applying said complement signal such that said register A represents said product of said two finite field elements B and C modulo $f_1(x)$.

16. A method of squaring a finite element B modulo an irreducible polynomial $f_1(x)$, wherein the finite field elements B is represented in terms of an optimal normal basis (ONB) of Type 1 over a field $F_{2^n}$ and said irreducible polynomial $f_1(x)$ being of degree n, said method comprising the steps of:
a) representing the element B as a vector of binary digits $b_i$, where $b_i$ is a co-efficient the $i^{th}$ basis element of said ONB representation of element B, arranged in polynomial order;
b) interleaving the binary digits of the representation of element B with zero digits to derive a square thereof;
c) storing in successive cells of a 2n cell shift register the binary digits of the interleaved representation of the element B;
d) reducing said square by a multiple $f_2(x)$ of the irreducible polynomial $f_1(x)$.

17. A method as defined in claim 16, said reduction is a cyclic shift of an upper n bits to the lower n bits.

18. A method of squaring a finite element B modulo an irreducible polynomial $f_1(x)$, wherein the finite field elements B is represented in terms of an optimal normal basis (ONB) of Type 1 over a field $F_{2^n}$ and said irreducible polynomial $f_1(x)$ being of degree n, said method comprising the steps of:
a) representing the element B as a vector of n binary digits $b_i$, where $b_i$ is a co-efficient the $i^{th}$ basis element of said ONB representation of element B, arranged in decreasing polynomial order;
b) selecting successive word length sets of said representation:
c) interleaving the binary digits of each said words with zero digits;
d) storing an xor of alternate sets of interleaved words in a register for all such sets; and
e) permuting said stored words to derive a square of said element B therefrom.

* * * * *